United States Patent
Minnich et al.

(10) Patent No.: US 7,578,345 B2
(45) Date of Patent: Aug. 25, 2009

(54) PROCESS FOR RECOVERING HEAVY OIL USING MULTIPLE EFFECT EVAPORATION

(75) Inventors: Keith R Minnich, Pewaukee, WI (US); Dorothy Neu, Pewaukee, WI (US)

(73) Assignee: HPD, LLC, Plainfield, IL (US)

( * ) Notice: Subject to any disclaimer, the term of this patent is extended or adjusted under 35 U.S.C. 154(b) by 0 days.

(21) Appl. No.: 12/035,163

(22) Filed: Feb. 21, 2008

(65) Prior Publication Data

US 2008/0196894 A1   Aug. 21, 2008

Related U.S. Application Data

(60) Provisional application No. 60/945,668, filed on Jun. 22, 2007, provisional application No. 60/890,889, filed on Feb. 21, 2007.

(51) Int. Cl.
*E21B 43/24* (2006.01)

(52) U.S. Cl. ............... 166/272.3; 166/267; 166/303; 166/371

(58) Field of Classification Search ............... None
See application file for complete search history.

(56) References Cited

U.S. PATENT DOCUMENTS

| | | | |
|---|---|---|---|
| 4,211,613 A | 7/1980 | Meckler | |
| 4,608,120 A | 8/1986 | Greenfield et al. | |
| 4,994,169 A | 2/1991 | Godino et al. | |
| 5,925,255 A | 7/1999 | Mukhopadhyay | |
| 6,733,636 B1 | 5/2004 | Heins | |
| 7,077,201 B2 | 7/2006 | Heins | |
| 7,150,320 B2 | 12/2006 | Heins | |
| 2003/0127400 A1 | 7/2003 | Kresnyak et al. | |
| 2007/0051513 A1* | 3/2007 | Heins | 166/265 |
| 2007/0221376 A1* | 9/2007 | Solomon et al. | 166/266 |

FOREIGN PATENT DOCUMENTS

| CA | 2307819 | 4/2005 |
|---|---|---|
| WO | 2005054746 | 6/2005 |

* cited by examiner

*Primary Examiner*—Zakiya W. Bates
(74) *Attorney, Agent, or Firm*—Coats & Bennett, P.L.L.C.

(57) ABSTRACT

A method for recovering heavy oil including recovering an oil-water mixture from a well and separating oil from the oil-water mixture to produce an oil product and produced water. The produced water is separated into a series of produced water streams. Each produced water stream is directed into each of a plurality of interconnected evaporators in a multiple effect evaporator. A first produced water stream is heated and vaporized to form a first vapor stream. The first vapor stream then heats and vaporizes a second produced water stream to form a second vapor stream. This process may continue wherein the second vapor stream heats and vaporizes a third produced water stream. The vapor streams are condensed to form a distillate that is directed to a steam generator. The steam generator then heats the distillate and produces steam to inject into an oil injection well.

25 Claims, 3 Drawing Sheets

PROCESS FOR RECOVERING HEAVY OIL USING MULTIPLE EFFECT EVAPORATION

CROSS-REFERENCE TO RELATED APPLICATIONS

This application claims priority under 35 U.S.C. § 119(e) from the following U.S. provisional applications: Application Ser. No. 60/945,668 filed on Jun. 22, 2007 and Application Ser. No. 60/890,889 filed on Feb. 21, 2007. These applications are incorporated in its entirety by reference herein.

FIELD OF INVENTION

The present invention relates to a process for recovering heavy oil, and more particularly, to an oil recovery process that utilizes a multiple effect evaporation system to treat produced water.

BACKGROUND

Conventional oil recovery involves drilling a well and pumping a mixture of oil and water from the well. Oil is separated from the water, and the water is usually injected into a sub-surface formation. Conventional recovery works well for low viscosity oil. However, conventional oil recovery processes do not work well for higher viscosity, or heavy, oil.

Enhanced Oil Recovery (EOR) processes employ thermal methods to improve the recovery of heavy oils from sub-surface reservoirs. The injection of steam into heavy oil bearing formations is a widely practiced EOR method. Typically, several tons of steam are required for each ton of oil recovered. Steam heats the oil in the reservoir, which reduces the viscosity of the oil and allows the oil to flow to a collection well. The steam condenses and mixes with the oil, the condensed steam being called produced water. The mixture of oil and produced water that flows to the collection well is pumped to the surface. Oil is separated from the produced water by conventional processes employed in conventional oil recovery operations.

For economic and environmental reasons it is desirable to recycle the produced water used in steam injection EOR. This is accomplished by treating the produced water, producing a feedwater, and directing the treated feedwater to a steam generator or boiler. The complete water cycle includes the steps of:
- injecting the steam into an oil bearing formation,
- condensing the steam to heat the oil whereupon the condensed steam mixes with the oil to become produced water,
- collecting the oil and produced water in a well,
- pumping the mixture of oil and produced water to the surface,
- separating the oil from the produced water,
- treating the produced water so that it becomes the steam generator or boiler feedwater, and
- converting the feedwater into steam that has a quality of approximately 70% to 80% for injecting into the oil bearing formation.

Treating the produced water to form a relatively pure distillate as feedwater in steam generation is challenging. It is known to chemically treat the produced water and subject the produced water to an evaporation process to form the distillate for steam generation feedwater. In particular, it is known to use a single evaporator and mechanical vapor compressor to produce the distillate. However, there are drawbacks and disadvantages to a single evaporator and mechanical vapor compression process. These systems tend to be expensive to operate and costly to maintain.

Therefore, there is a need in heavy oil recovery processes for a more cost-effective evaporation system for treating produced water and producing a relatively pure feedwater stream for a steam generation system.

SUMMARY OF THE INVENTION

The present invention relates to a system and process for recovering oil. The system and process employs multiple effect evaporation to treat produced water resulting from an upstream oil/water separation process. The multiple effect evaporation process produces a distillate forming a feedwater that is directed to a steam generation system that produces steam. The steam is injected into an injection well and facilitates the removal of oil from an oil bearing formation.

A multiple effect evaporation system forms a part of the oil recovery system and process. The multiple effect evaporation system comprises a plurality of evaporators interconnected. Produced water directed into the multiple effect evaporator system. The energy to evaporate the produced water, steam or hot water, or vapor recycled from a downstream effect through a mechanical vapor compressor, is directed into an initial evaporator forming one of the interconnected evaporators of the multiple effect system. The steam acts as an initial heat transfer medium that evaporates the produced water directed into the initial evaporator. Vapor produced from the feedwater in the initial evaporator is directed to the downstream evaporator where it functions as a heat transfer medium to evaporate the feedwater directed into the downstream evaporator. This process is continued across the interconnected evaporators such that the vapor produced from the feedwater in one evaporator is used as the heat transfer medium to evaporate the feedwater in the downstream evaporator. During this process, the heat transfer medium (i.e., the produced vapor from the preceding evaporator) will condense in each evaporator and form the distillate. The distillate is collected from the evaporators and used as feedwater for the steam generation system.

Other objects and advantages of the present invention will become apparent and obvious from a study of the following description and the accompanying drawings which are merely illustrative of such invention.

METHOD OF REMOVING HEAVY OIL

With further reference to the drawings, the present invention entails a process for removing heavy oil, such as the SAGD process used to recover oil found in the northern region of Canada. In implementing the SAGD process, for example, steam at approximately 98% quality is injected into a horizontal injection well that extends through or adjacent to an oil bearing formation. The heat associated with the steam causes oil to drain into an underlying collection well. Because the steam condenses, the process results in an oil-water mixture being collected in the collection well and pumped to the surface.

The oil-water mixture is subjected to a separation process which effectively separates the oil from the water. This is commonly referred to as primary separation and can be carried out by various conventional processes such as gravity or centrifugal separation. Separated water is subjected, in some cases, to a de-oiling process where additional oil is removed from the water. Resulting water from the above oil-water separation process is referred to as produced water.

Produced water from the primary separation process includes dissolved organic ions, dissolved organic compounds, suspended inorganic and organic solids, and dissolved gases. Typically, the total suspended solids in the produced water is less than about 1000 ppm.

In some cases, after primary separation, it may be desirable to remove suspended inorganic and organic solids from the produced water. Various types of processes can be utilized to remove the suspended solids. For example, the produced water can be subjected to gas flotation processes or other processes that use centrifugal force, gravity separation, or adsorbent or absorbent processes. After treating the produced water to remove suspended solids, typically the concentration of the suspended solids in the produced water is less than 50 ppm.

Figure 1:
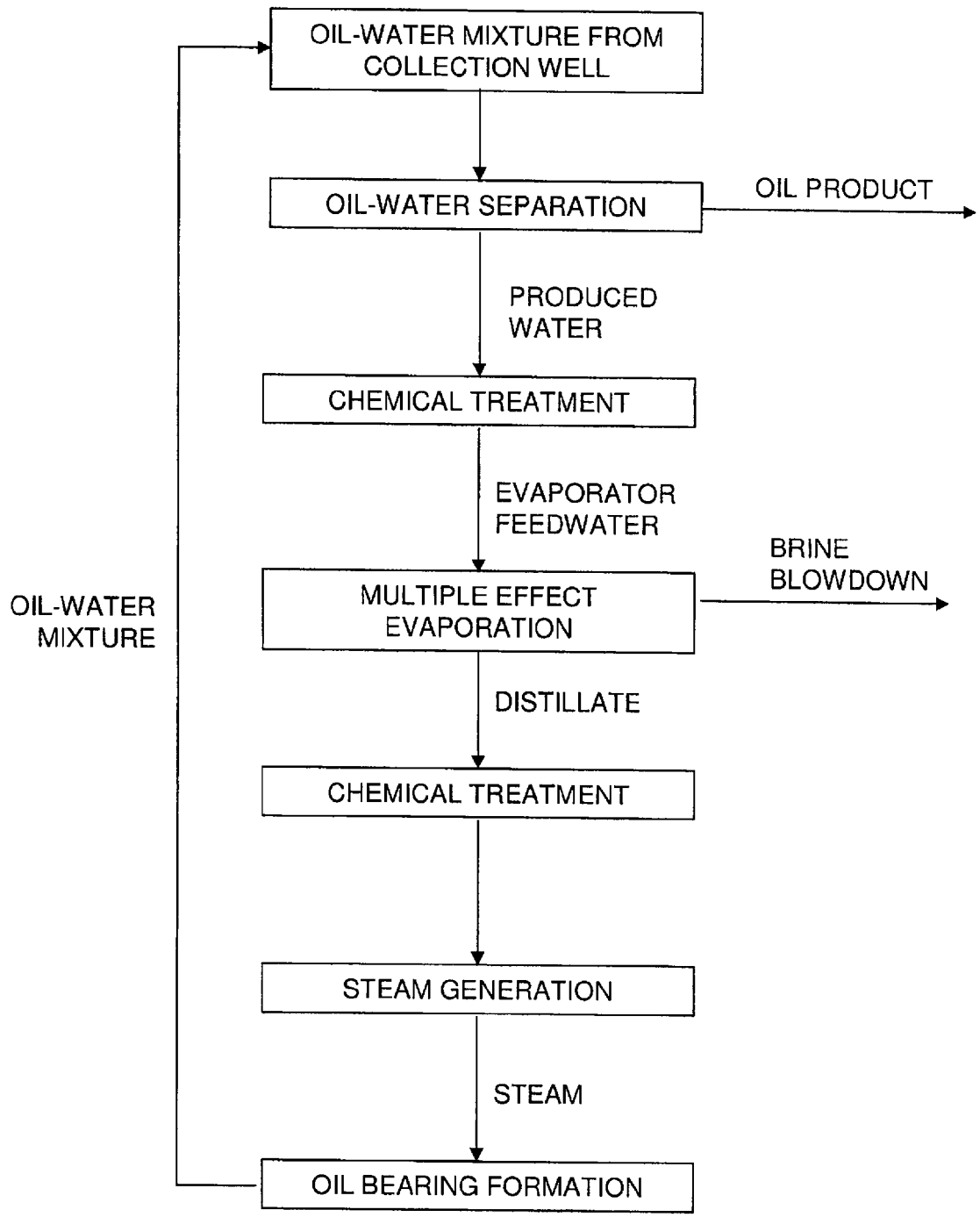
FIG. 1 is a flowchart illustrating basic steps for a heavy oil recovery process.
Figure 2:
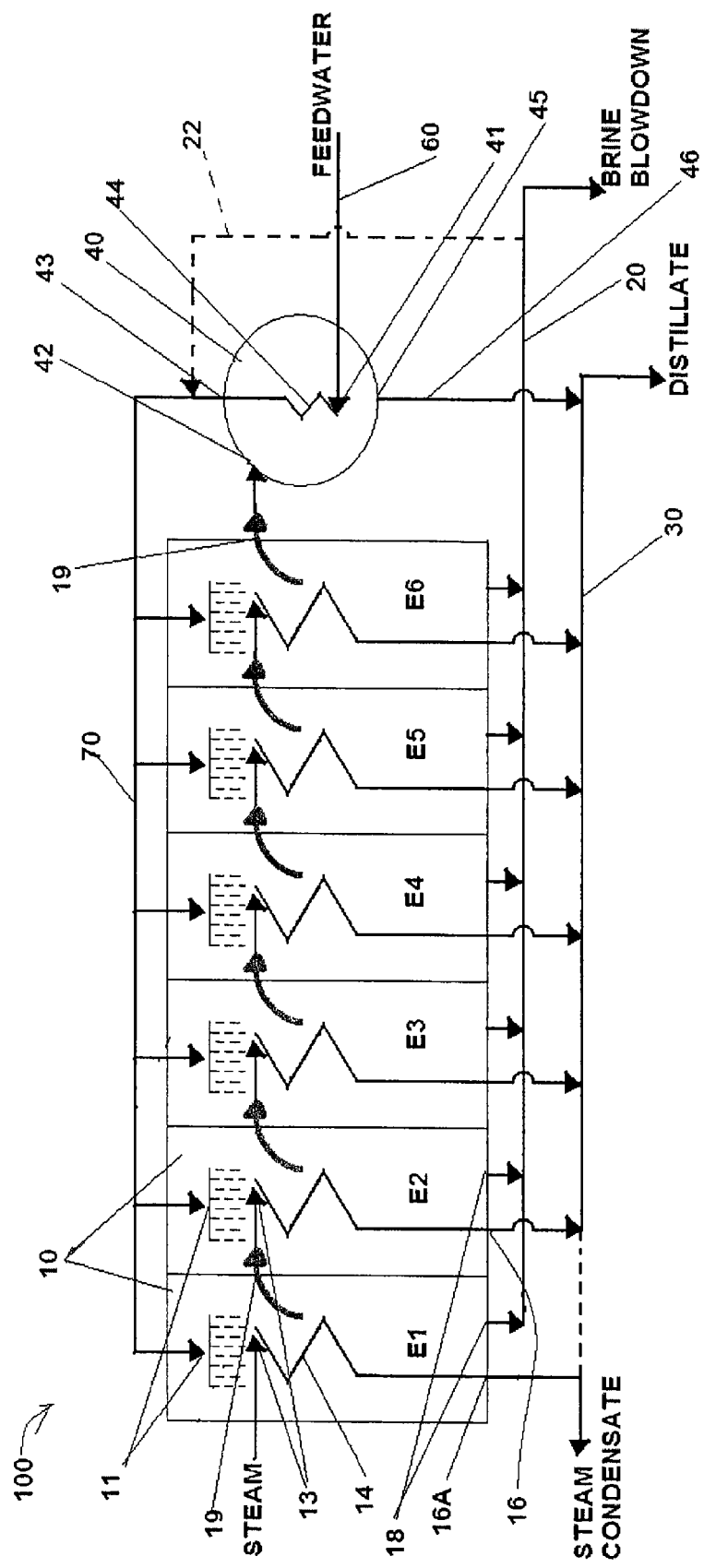
FIG. 2 is a schematic illustration of a simplified multiple effect evaporator system for producing distillate from produced water which is used for steam generation.

In addition to suspended solids, produced water from heavy oil recovery processes includes dissolved organic and inorganic solids in varying portions. As discussed below, the produced water will eventually be fed to an evaporator, and the evaporator will produce a distillate that will be directed to a steam generator or boiler. Because the dissolved organic or inorganic solids in the produced water have the potential to foul the evaporator and the steam generator or boiler, additional treatment may be required after primary separation. Depending on the absolute and relative concentration of dissolved solids, chemical treatment of the produced water may be utilized after primary separation. Various types of chemical treatment can be employed. For example, scale inhibitors and/or dispersants can be added to the produced water to prevent inorganic fouling and scaling in the evaporator for hardness concentrations of approximately 150 ppm as $CaCO_3$ or less. In addition, silica scale inhibitors can be mixed with the produced water to prevent silica fouling and scaling in the evaporator. Moreover, the chemical treatment can include the addition of acid to partially convert alkalinity to $CO_2$, and thereafter the $CO_2$ can be removed by degassing. Finally, a caustic can be added to the produced water to increase the pH to approximately 10. This will have the tendency to prevent organic and silica fouling in the evaporator system. After the produced water has been chemically treated, it is directed to a multiple effect evaporation system indicated generally by the numeral 100 in FIG. 2. As will be appreciated from subsequent discussion, the multiple effect evaporation system 100 produces a distillate and a brine blowdown, the brine blowdown being more concentrated with solids than the entering produced water. The distillate is then further treated and ultimately used in a steam generator or boiler. As will be fully appreciated from the following discussion, the multiple effect evaporation system 100 comprises a plurality of evaporators 10 interconnected. Energy for evaporating the feedwater directed to the multiple effect evaporation system 100 is provided to one evaporator. In the case of the embodiment illustrated herein, plant steam is directed to the initial evaporator E1. As will be explained in subsequent portions of this disclosure, vapor produced from the feedwater directed to one evaporator is used as a heat transfer medium to vaporize feedwater directed into a downstream evaporator. The vapor produced from the feedwater is condensed (after it functions as a heat transfer medium) to form the distillate which is collected and directed to a downstream steam generation system. An example of a six-body multiple effect evaporation system 100 is shown schematically in FIG. 2. Evaporators 10 in FIG. 2 are labeled E1, E2, E3, E4, E5, and E6. It is appreciated that any number of evaporators may be interconnected as shown, and the present discussion of six is an example of how a multiple effect evaporation system can be configured. Each evaporator 10 includes a feedwater inlet 11 to receive the feedwater or produced water to be evaporated. The feedwater is divided among the inlets 11 of the evaporators 10 such that a portion of the feedwater enters each evaporator.

Feedwater entering through feedwater inlet 11 of each evaporator 10 is distributed over one or more surfaces of an evaporator heat exchange element 14 in each evaporator. Each heat transfer element 14 includes a heat transfer medium inlet 13 and a heat transfer medium condensate outlet 16. Each heat exchange element 14 will generally include a first surface to receive a heat transfer medium and a second surface to receive the feed water to be evaporated. Each evaporator heat exchange element 14 can be considered, for example, as a coiled tube wherein a heat transfer medium is caused to flow through the tube. The inner surface of the tube comprises the first surface. The feedwater to be evaporated is caused to flow around the outside of the tube, and the outside of the tube forms the second surface. Other forms of evaporator heat exchange elements 14 may be used including horizontal or vertical shell-tube units, banked plate units, and various other units.

Condensate outlet 16 of each evaporator 10 receives condensed heat transfer medium from each evaporator heat exchange element 14. A brine outlet 18 is disposed on each evaporator 10 to receive the portion of the feedwater that is not evaporated. The unevaporated portion includes water and solid contaminants from the feedwater and is sometimes referred to as concentrated brine. A vapor outlet 19 associated with each evaporator 10 receives the evaporated portion of the feedwater. In a single effect evaporator, the vapor from vapor outlet 19 is generally condensed and collected to produce a distillate. However, in the case of multiple effect evaporator system 100, as shown in FIG. 2, the vapor from one evaporator 10 is supplied to the heat transfer medium inlet 13 of a down stream evaporator. That is, relative to the heat transfer medium and vapor generated, evaporators 10 are in a series arrangement. More particularly, relative to the embodiment illustrated, the vapor produced by evaporator E1 is supplied to heat transfer medium inlet 13 of evaporator E2; produced vapor from E2 is likewise supplied to E3, and so forth.

In the embodiment illustrated, steam from a steam source, plant steam for example, is used as the heat transfer medium for evaporator, E1 in FIG. 2. Steam condensate is ejected from evaporator body E1 by way of condensate outlet 16A. Concentrated brine is directed to brine collection line 20 through brine outlet 18, and vapor produced is supplied from vapor outlet 19 of evaporator E1 to heat transfer medium inlet 13 of evaporator E2 as described above. It is appreciated, then, that feedwater entering feedwater inlet 11 of evaporator unit E2 is evaporated by heat transferred from vapor produced by evaporator E1. Likewise, vapor produced by evaporator E2 serves as the heat transfer medium to evaporate feed water in evaporator E3, and so forth. The evaporators can be disposed in series or parallel relationship. In some embodiments there are many evaporators, in some cases as many as nine, again connected in series or parallel.

It is appreciated that the condensate produced in evaporator E2 is directed from condensate outlet 16 of that evaporator to distillate collection line 30. The concentrated brine from brine outlet 18 of evaporator E2 is directed into brine collection line 20. Likewise, in the six-body multiple effect evaporator system illustrated, the condensate produced by evaporators E2, E3, E4, E5, and E6 is directed to distillate collection line 20. In a similar fashion, the brine produced by evaporators E2, E3, E4, E5, and E6 is directed to brine collection line 20. It is further appreciated that the condensate from evaporator E1 may optionally be directed to distillate collection line 30.

Each evaporator E2, E3, E4, and E5, in the particular embodiment illustrated in FIG. 2, is interconnected with two other evaporators 10 as well as to distillate collection line 30 and brine collection line 20 as described above. Evaporator E6 in the six-body embodiment shown receives vapor from upstream evaporator E5 while vapor produced by evaporator E6 is supplied to heat transfer medium inlet 42 of a condenser 40.

Condenser 40 includes a condenser heat exchange element 44 that receives the feedwater to be evaporated by multiple effect evaporator system 100. Heat from vapor supplied from evaporator E6, serves to pre-heat the feedwater in the embodiment illustrated. The vapor is condensed and directed to condenser condensate outlet 45. Condenser condensate outlet 45 is connected to distillate collection line 30.

Feedwater pre-heated in condenser 40 is directed to condenser feed water outlet 43 which is connected to feedwater distribution line 70. Inlets 11 of evaporators 10 are connected to feedwater distribution line 70 to receive the feedwater as described above.

Turning now to the brine and distillate collected from multiple effect evaporation system 100, it is appreciated that these flows are collected in brine and distillate lines 20 and 30, respectively. A portion of the brine may be recirculated through brine recirculation line 22 and added to the feed water as required. The remainder of the brine collected is ejected as brine blowdown to remove concentrated solids from the multiple effect evaporation system 100. The collected distillate is directed from distillate collection line 30 for further treatment and use in steam generation.

Multiple effect evaporator system 100 can be made more thermally efficient for a given evaporation rate through addition of effects (evaporators), pre-heaters, or a thermocompressor. Feed schemes (e.g. series, parallel, backward, forward, or combinations thereof), evaporator type (e.g. horizontal tube thin film, vertical tube falling film, submerged tube, etc), and distillate and brine collection schemes (series and/or parallel) can also be varied to improve the evaporation process.

Vapor from the last evaporator can be condensed by mediums other than the feedwater, e.g. external cooling water or air. The vapor can also be used in other processes as required.

Figure 3:
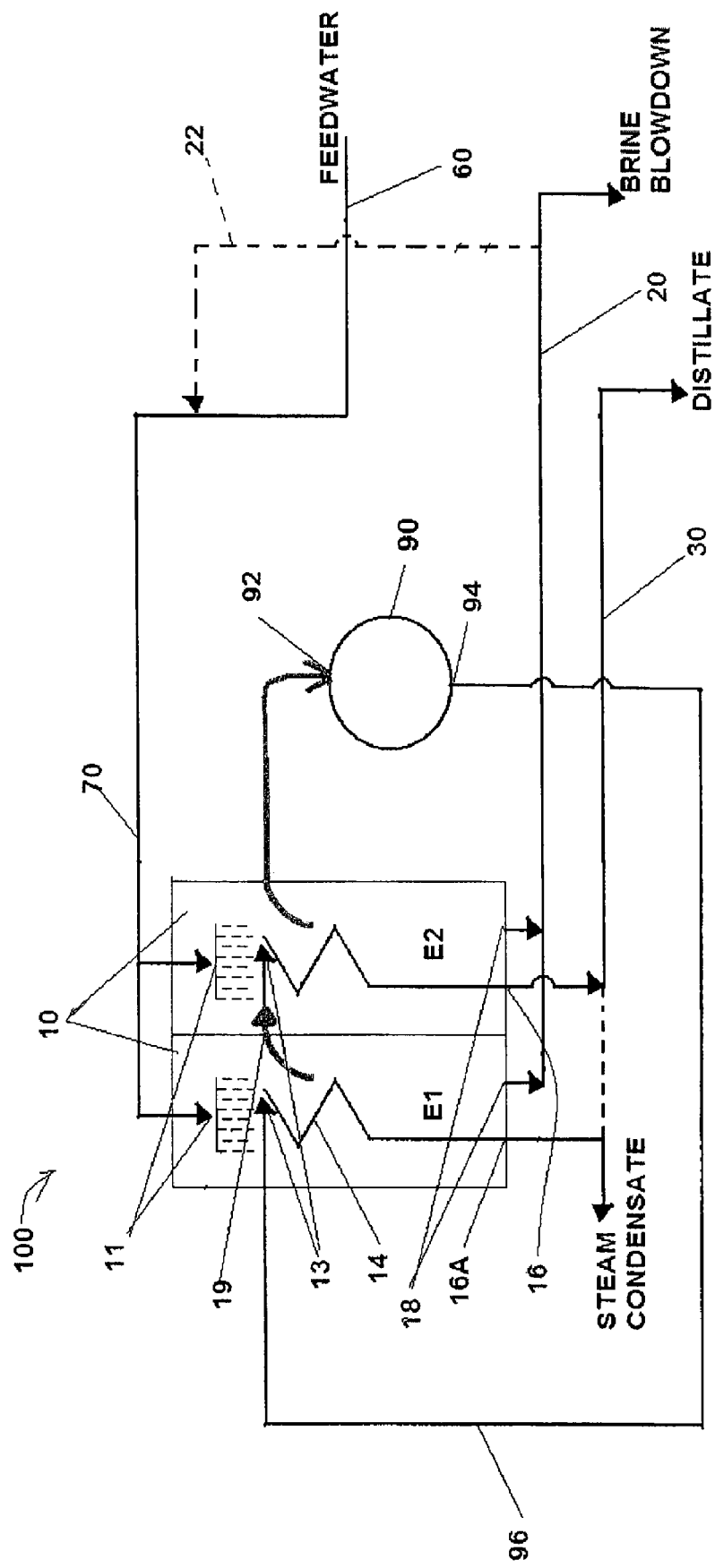
FIG. 3 is a schematic illustration of an alternate embodiment of a simplified multiple effect evaporator system for producing distillate from produced water which is used for steam generation

In an alternate embodiment, illustrated in FIG. 3, the vapor from the last effect may go to a mechanical vapor compressor where it is compressed and discharged as the heating medium to the first evaporator effect. In this embodiment, the feedwater is not used to condense the vapor from the last effect. Rather, energy is added to the vapor from the last effect by compressing the vapor such that is may be used as the heat transfer medium and supplied to the first effect. This embodiment may be illustrated in a multiple effect evaporator using two evaporators E1 and E2. After establishing steady state operation, for which plant steam may be required, the vapor evolved from evaporator E2 is directed to inlet 92 of a compressor 90 where it is compressed and directed to outlet 94. Thence it is conducted to inlet 13 of evaporator E1 to serve as the heat transfer medium for the multiple effect evaporator 100.

The chemistry of the distillate will vary, and accordingly, the chemical treatment of the distillate suggested herein will also vary depending on distillate chemistry, the type of steam generation system utilized, operating pressures of the steam generation system, and the quality of steam produced, as well as other factors. In a typical SAGD process, the distillate stream includes but is not limited to Ca, Mg, Na, K, $Fe^{+3}$, $Mn^{+2}$, $Ba^{+2}$, $Sr^{+2}$, $SO_4$, Cl, F, $NO_3$, $HCO_3$, $CO_3$, $PO_4$, $SiO_2$. A typical concentration for a number of the above elements is: Ca—0.0054 mg/l, Mg—0.0010 mg/l, Na—0.3606 mg/l, and K—0.0083 mg/l. Also, in a typical distillate, one would find suspended solids to be approximately 0.13 mg/l, TOC to be approximately 40 mg/l, and hardness as mg/l of $CaCO_3$—0.0176 mg/l. The pH of a typical distillate may be approximately 8.5. The chemical treatment for hardness could include a polymer-phosphate blend or a chelant. This will solubilize hardness and prevent corrosion. A typically polymer-phosphate blend would comprise trisodium phosphate (TSP); sulfonated styrene/maleic acid (SSMA); high performance quad-sulfonated polymer; and phosphinocarboxylic acid (PCA). A caustic, such as NaOH, can be injected as required to adjust the pH of the distillate. The chemicals may also or alternatively be injected upstream of the multiple effect evaporator or directly into the evaporator.

After treatment, if a treatment process is implemented, the distillate is directed to a steam generation system. The steam generation system can assume various forms such as a boiler or a once through steam generator (OTSG) or a package boiler. Steam produced by the steam generation system is directed into an injection well where the steam facilitates the recovery of oil from oil bearing formations.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of recovering heavy oil from an oil well comprising:
   recovering an oil-water mixture from the well;
   separating oil from the oil-water mixture to produce an oil product and produced water;
   directing the produced water to each of a plurality of interconnected evaporators in a multiple effect evaporator;
   directing plant steam into an initial evaporator, transferring heat from the plant steam to the produced water in the initial evaporator and evaporating at least a portion of the produced water in the initial evaporator to form a first vapor stream;
   directing the first vapor stream to a downstream evaporator, transferring heat from the first vapor stream to the produced water in the downstream evaporator and evaporating at least a portion of the produced water in the downstream evaporator to form a second vapor stream;
   condensing at least a portion of the first and second vapor streams to form a distillate;
   directing the distillate to a steam generator and heating the distillate in the steam generator to produce steam for injection into an injection well; and
   injecting the steam in the steam generator into the injection well.

2. The method of claim 1 including collecting at least a portion of unevaporated produced water in the initial and downstream evaporators to produce brine and discharging at least a portion of the brine.

3. The method of claim 2 including directing at least a portion of the brine through a brine recirculation line and then adding at least a portion of the brine to the produced water prior to directing the produced water to each of the plurality of interconnected evaporators.

4. The method of claim 1 wherein the multiple effect evaporator includes at least two interconnected evaporators arranged in series.

5. The method of claim 4 including transferring heat from a preceding evaporator to the produced water in a final evaporator, evaporating at least a portion of the produced water in the final evaporator to form a final vapor stream.

6. The method of claim 5 including directing at least a portion of the final vapor stream into a condenser.

7. The method of claim 6 including directing the produced water into the condenser prior to directing the produced water into each of the plurality of interconnected evaporators, and heating the produced water in the condenser with the final vapor stream.

8. The method of claim 6 including condensing at least a portion of the final vapor stream to form a condensed vapor stream and directing at least a portion the condensed vapor stream to a condensate outlet connected to a distillate collection line.

9. The method of claim 6 including condensing the final vapor stream with external cooling water or air.

10. The method of claim 6 including directing the produced water heated in the condenser to any one of the plurality of interconnected evaporators.

11. The method of claim 5 including compressing at least a portion of the final vapor stream to form compressed vapor, directing the compressed vapor to the initial evaporator, and at least partially heating the produced water in the initial evaporator with the compressed vapor.

12. The method of claim 11 including compressing at least a portion of the final vapor stream in a mechanical vapor compressor.

13. The method of claim 1 including three or more evaporators.

14. A method of recovering heavy oil from an oil well comprising:
recovering an oil-water mixture from the well;
separating oil from the oil-water mixture to produce an oil product and produced water;
splitting the produced water into a series of produced water streams;
heating a first produced water stream and vaporizing at least a portion of the first produced water stream to form a first vapor stream;
heating a second produced water stream with the first vapor stream and vaporizing at least a portion of the second produced water stream to form a second vapor stream;
condensing the first and second vapor streams to form a distillate;
directing the distillate to a steam generator and heating the distillate in the steam generator to produce steam for injection into an injection well; and
injecting the steam in the steam generator into an injection well.

15. The method of claim 14 including heating at least a portion of the first produced water stream with a heat source unassociated with the produced water to form the first vapor stream, thereafter utilizing heat associated with the first vapor stream to vaporize at least a portion of the second produced water stream to form the second vapor stream and condensing at least a portion of the first and second vapor streams to form the distillate.

16. The method of claim 14 including directing the first produced water stream to a first evaporator, directing the second produced water stream to a second evaporator, heating the first and second produced water streams to form the first and second vapor streams, and condensing the first and second vapor streams to form a distillate.

17. The method of claim 14 including preheating the produced water prior to splitting the produced water into a series of produced water streams.

18. The method of claim 17 including preheating the produced water with a preheating vapor stream that derives at least some heat energy from vapor produced by the one or more produced water streams.

19. The method of claim 18 including heating a final produced water stream, evaporating at least a portion of the final produced water stream to form the preheating vapor stream and directing at least a portion of the preheating vapor stream into a condenser.

20. The method of claim 19 including directing the produced water into the condenser prior to splitting the produced water into a series of produced water streams, and heating the produced water in the condenser with the preheating vapor stream.

21. The method of claim 14 including producing brine by collecting at least a portion of unevaporated first and second produced water streams and discharging at least a portion of the brine.

22. The method of claim 21 including collecting at least a portion of the brine through a brine recirculation line and then adding at least a portion of the brine to the produced water prior to splitting the produced water into a series of produced water streams.

23. The method of claim 14 including heating a third produced water stream with the second vapor stream and vaporizing at least a portion of the third produced water stream to form a third vapor stream.

24. The method of claim 14 including compressing at least one of the vapor streams to form compressed vapor and utilizing the compressed vapor to heat at least one of the produced water streams.

25. The method of claim 24 wherein one of the produced water streams is an initial produced water stream and one of the vapor streams is a final vapor stream; compressing at least a portion of the final vapor stream to form a compressed vapor, directing the compressed vapor to the initial produced water stream and at least partially heating the initial produced water stream with the compressed vapor.

* * * * *